United States Patent
Li et al.

(10) Patent No.: US 7,634,406 B2
(45) Date of Patent: Dec. 15, 2009

(54) SYSTEM AND METHOD FOR IDENTIFYING SEMANTIC INTENT FROM ACOUSTIC INFORMATION

(75) Inventors: Xiao Li, Seattle, WA (US); Asela J. Gunawardana, Seattle, WA (US); Alejandro Acero, Bellevue, WA (US); Milind Mahajan, Redmond, WA (US); Dong Yu, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 688 days.

(21) Appl. No.: 11/009,630

(22) Filed: Dec. 10, 2004

(65) Prior Publication Data

US 2006/0129397 A1    Jun. 15, 2006

(51) Int. Cl.
*G10L 15/06* (2006.01)
(52) U.S. Cl. ................ 704/244; 704/243; 704/257
(58) Field of Classification Search .............. 704/9, 704/10, 242–245, 257, 270, 270.1
See application file for complete search history.

(56) References Cited

U.S. PATENT DOCUMENTS

| | | | | |
|---|---|---|---|---|
| 5,237,503 A * | 8/1993 | Bedecarrax et al. | ........... | 704/10 |
| 5,659,662 A * | 8/1997 | Wilcox et al. | ............... | 704/245 |
| 5,787,395 A * | 7/1998 | Minamino | .................. | 704/255 |
| 5,806,030 A * | 9/1998 | Junqua | ........................ | 704/245 |
| 5,809,476 A * | 9/1998 | Ryan | .............................. | 705/2 |
| 5,812,975 A * | 9/1998 | Komori et al. | .............. | 704/256 |
| 5,835,893 A * | 11/1998 | Ushioda | ..................... | 704/257 |
| 6,449,612 B1 * | 9/2002 | Bradley et al. | ................. | 707/6 |
| 6,526,379 B1 * | 2/2003 | Rigazio et al. | .............. | 704/245 |
| 6,601,055 B1 * | 7/2003 | Roberts | ....................... | 706/45 |
| 6,640,207 B2 * | 10/2003 | Witschel | ........................ | 704/9 |
| 6,725,195 B2 * | 4/2004 | Sankar et al. | ............... | 704/240 |
| 6,937,983 B2 * | 8/2005 | Romero | ....................... | 704/257 |
| 6,961,702 B2 * | 11/2005 | Dobler et al. | ............... | 704/244 |
| 7,031,909 B2 * | 4/2006 | Mao et al. | ....................... | 704/9 |
| 7,107,207 B2 * | 9/2006 | Goodman | ....................... | 704/9 |

(Continued)

FOREIGN PATENT DOCUMENTS

| | | |
|---|---|---|
| EP | 0890942 | 1/1999 |
| WO | WO 01/52510 | 7/2001 |
| WO | WO 02/087201 | 10/2002 |

OTHER PUBLICATIONS

Souvignier, B.; Kellner, A.; Rueber, B.; Schramm, H.; Seide, F., "The thoughtful elephant: strategies for spoken dialog systems," Speech and Audio Processing, IEEE Transactions on , vol. 8, No. 1, pp. 51-62, Jan. 2000.*

(Continued)

*Primary Examiner*—Richemond Dorvil
*Assistant Examiner*—Douglas C Godbold
(74) *Attorney, Agent, or Firm*—Westman, Champlin & Kelly, P.A.

(57) ABSTRACT

In accordance with one embodiment of the present invention, unanticipated semantic intents are discovered in audio data in an unsupervised manner. For instance, the audio acoustics are clustered based on semantic intent and representative acoustics are chosen for each cluster. The human then need only listen to a small number of representative acoustics for each cluster (and possibly only one per cluster) in order to identify the unforeseen semantic intents.

33 Claims, 5 Drawing Sheets

U.S. PATENT DOCUMENTS

| | | | |
|---|---|---|---|
| 7,275,033 B1* | 9/2007 | Zhao et al. ................... 704/255 |
| 2002/0002454 A1* | 1/2002 | Bangalore et al. ............... 704/9 |
| 2002/0128821 A1* | 9/2002 | Ehsani et al. ................. 704/10 |
| 2002/0188681 A1* | 12/2002 | Gruen et al. ................. 709/204 |
| 2003/0040906 A1* | 2/2003 | Sankar et al. ............... 704/231 |
| 2003/0154072 A1* | 8/2003 | Young et al. .................... 704/9 |
| 2003/0177000 A1* | 9/2003 | Mao et al. ....................... 704/9 |
| 2003/0217335 A1* | 11/2003 | Chung et al. ................ 715/514 |
| 2003/0236662 A1* | 12/2003 | Goodman .................... 704/224 |
| 2004/0030552 A1* | 2/2004 | Omote et al. ............... 704/245 |
| 2004/0148155 A1* | 7/2004 | Vogel ............................ 704/9 |
| 2004/0193414 A1* | 9/2004 | Calistri-Yeh et al. ........ 704/245 |
| 2004/0230577 A1* | 11/2004 | Kawatani ....................... 707/6 |
| 2004/0249636 A1* | 12/2004 | Applebaum et al. ......... 704/231 |

OTHER PUBLICATIONS

R. Kneser, J. Peters, "Semantic Clustering for Adaptive Language Modeling," icassp, p. 779, 1997 IEEE International Conference on Acoustics, Speech, and Signal Processing (ICASSP'97)—vol. 2, 1997.*

Rauber, A., LabelSom: On the labeling of self-organizing maps (1999), In Proc. International Joint Conference on Neural Networks.*

Weili Wu et al., "Clustering and Information Retrieval", Kluwer Academic Publishers, 2004 Book Reference.

Mei-Yuh Hwang, et al., "Shared-Distribution Hidden Markov Model for Speech Recognition" IEEE Transactions on Speech and Audio Processing, vol. 1, No. 4, Oct. 1993. pp. 414-420.

S. J. Young et al., "Tree-Based State Trying for High Accuracy Acoustic Modelling", Proceedings of a Workshop held at Plainsboro, NJ, Mar. 8-11, 1994, pp. 307-312.

Charu C. Aggarwal et al., "On Using Partial Supervision for Text Categorization" IEEE Transactions on Knowledge and Data Engineering, Feb. 2004, vol. 16, No. 2 pp. 245-255.

Douglas R. Cutting et al., "Constant Interaction-Time Scatter/Gather Browsing of Very Large Document Collections", ACM Press SIGIR 1993, pp. 126-134.

Carlson B A: "Unsupervised Topic Clustering of Switchboard Speech Messages" 1996 IEEE International Conference on Acoustics, Speech and Signal Processing Conference Proceedings (Cat. No. 96CH35903) IEEE New York, NY, USA, vol. 1, 1996, pp. 315-318.

Xiao Li et al.: "Unsupervised Semantic Intent Discovery from Call Log Acoustics" Acoustics, Speech and Signal Processing, 2005. Proceedings (ICASSP '05) IEEE International Conference on Philadelphia Penn. USA, Mar. 18-23, 2005, pp. 45-48.

Bechet, Riccardi et al., "Mining Spoken Dialogue Corpora for System Evaluation and Modeling" Conference on Empirical Methods in Natural Language Processing [online] Jul. 25, 2004 URL:http://dit.unitn.it/{riccardi/papers/emnlp2004.pdf [retrieved on Oct. 4, 2007].

Cooper JW et al: "Samsa: A Speech Analysis, Mining and Summary Application for Outbound Telephone Calls" System Sciences, 2001. Proceedings of the 34th Annual Hawaii International Conference on Jan. 3-6, 2001, Piscataway, NJ, USA IEEE Jan. 3, 2001 pp. 1338-1346.

European Search Report, Application No. 05111074.0, dated Oct. 30, 2007.

* cited by examiner

SYSTEM AND METHOD FOR IDENTIFYING SEMANTIC INTENT FROM ACOUSTIC INFORMATION

BACKGROUND OF THE INVENTION

The present invention deals with identifying semantic intent in acoustic information. More specifically, the present invention deals with grouping acoustic information (such as acoustic information from call logs) into clusters, each representing a category of semantic intent.

Automatic voice response systems have gained increasing popularity in enhancing human-machine interaction. Conventional automatic voice response systems allow a user to call the system using a telephone and then navigate through a voice-responsive menu in order to receive desired information, or to be routed to a desired destination. For instance, in some such systems, a user may call to review an account summary of the user's account with a particular business. In that case, the user may navigate through an account summary menu, using voice commands, to obtain an account balance, for example.

In another such system, the user may dial the general telephone number of a company and navigate through a voice-responsive menu to reach a particular individual at the company, or to reach a department, such as "technical service".

These types of systems have encountered a number of problems. In such systems, rules-based finite state or context free grammars (CFGs) are often used as a language model (LM) for simple, system-initiative dialog applications. This type of restricted strategy often leads to high recognition performance for in-grammar utterances, but completely fails when a user's response is not contained in the grammar.

There are at least two causes for such "out-of-grammar utterances". First, the syntactic structure of the utterance may not be parsed consistently by the CFG. For instance, a user's response of "twentieth of July" may cause failure in a grammar which is structured to include a rule [month] [day]. Second, the user's utterance may reflect a semantic intent which was not anticipated by the author of the grammar. For instance, in a corporate voice dialer application, the grammar for the response to the opening prompt "Good morning, who would you like to contact?" may be designed to expect the user to provide a name. However, the user may instead respond by identifying a department such as "human resources."

In sum, at the application design stage, it is difficult for an application developer to anticipate all the different ways in which a user may frame a request, which leads to the first problem. Similarly, it is difficult for an application developer to anticipate all the different semantic intents that the user may have, leading to the second problem.

Many attempts have been made to address the first problem (the difficulty in anticipating the different ways a user may frame a request) by building more robust language models. For example, hand-authored combinations of context free grammars (CFGs) with statistical language models has been attempted.

Prior attempts at solving the second problem (anticipating all the different semantic intents used by the user) typically require a large amount of transcribed and semantically annotated data from actual user calls. Of course, this tends to be extremely expensive to generate. For instance, in order to generate this type of semantically annotated data, the actual incoming calls must be recorded. Then, a human being must typically listen to all of these recordings in order to identify any semantic intents used by the caller, that were not yet expected or anticipated by the developer. However, a large company, which generates the call volumes necessary to obtain a useful quantity of data, may receive several thousand calls per day. Even if the human being only listens to the calls which failed in the interactive voice response unit (e.g., calls which ended in hang-ups) and if those calls only made up ten to twenty percent of the entire call volume, this would require the human to listen to hundreds of calls each day. This is extremely time consuming and expensive.

SUMMARY OF THE INVENTION

In accordance with one embodiment of the present invention, unanticipated semantic intents are discovered in audio data in an unsupervised manner. For instance, the audio acoustics are clustered based on semantic intent and representative acoustics are chosen for each cluster. The human then need only listen to a small number of representative acoustics for each cluster (and possibly only one per cluster) in order to identify the unforeseen semantic intents.

The acoustics are subjected to speech recognition. The clustering is then performed on the speech recognition results, as opposed to the acoustics themselves. The developer may be able to identify unknown semantic intent by reviewing the speech recognition results.

In one embodiment, the developer need not even listen to any of the acoustics to identify unanticipated semantic intents. Instead, the new semantic intents can automatically be determined by tracking whether the acoustic clusters were recognized in the speech recognition process using the application grammar or a background grammar. If they were recognized using rules from the application grammar, then the semantic intent already exists in the application grammar and is not new. However, if they were recognized using a background grammar, then the semantic intent is not represented in the application grammar and is identified as a new, or unanticipated, semantic intent.

In accordance with an embodiment, the clusters are analyzed, automatically, and possible additional rules or revisions to the application grammars or language models in the human-machine interface (such as the AVR system) are automatically suggested.

DETAILED DESCRIPTION OF ILLUSTRATIVE EMBODIMENTS

A. Computing System Overview

The present invention relates to identifying unforeseen or unanticipated, semantic intents in acoustic data. However, before discussing the present invention in greater detail, one illustrative environment in which the present invention can be used will be discussed.

Figure 1:
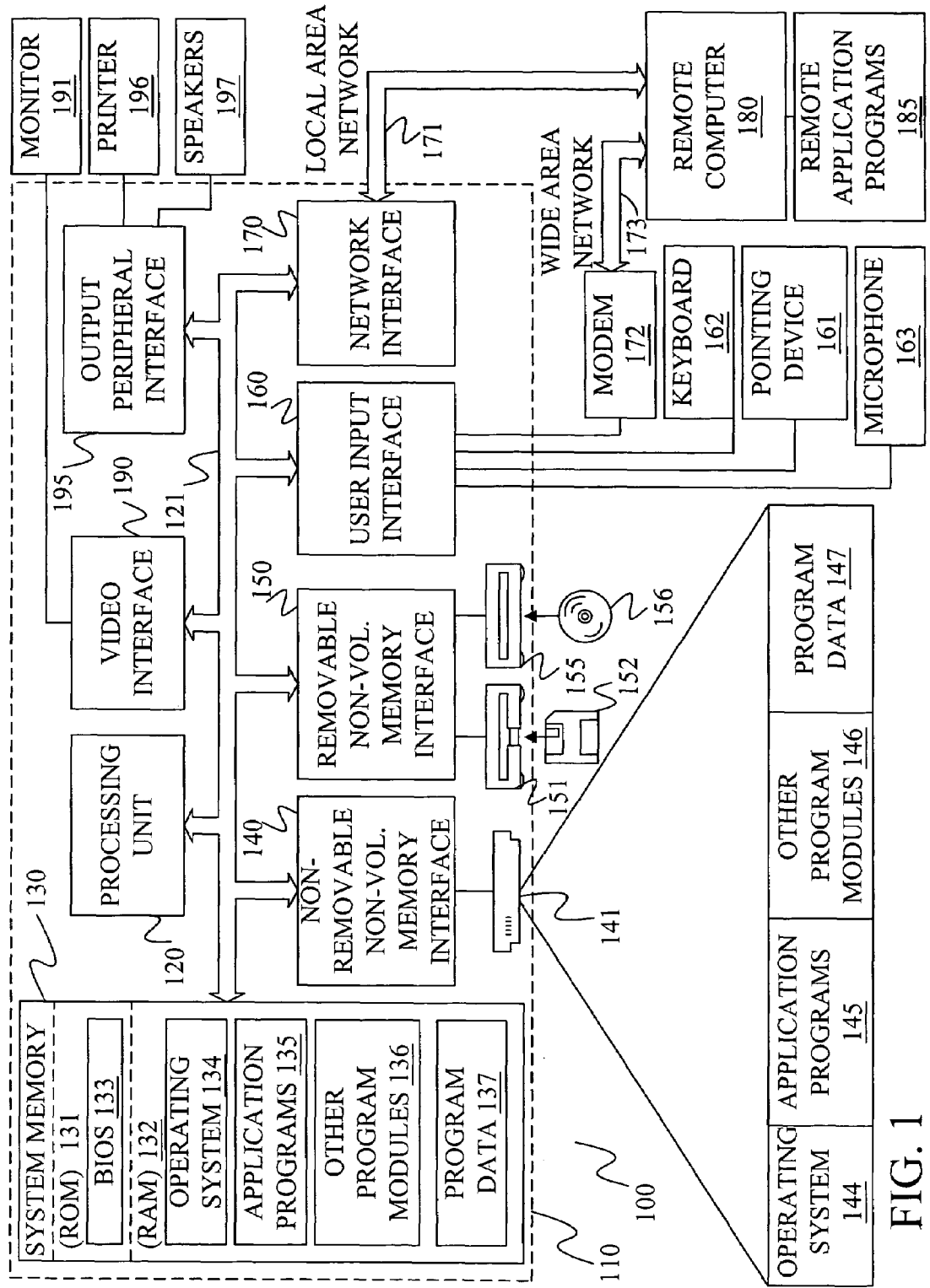
FIG. 1 is a block diagram of one illustrative environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

B. Acoustic Processing System Overview

Figure 2:
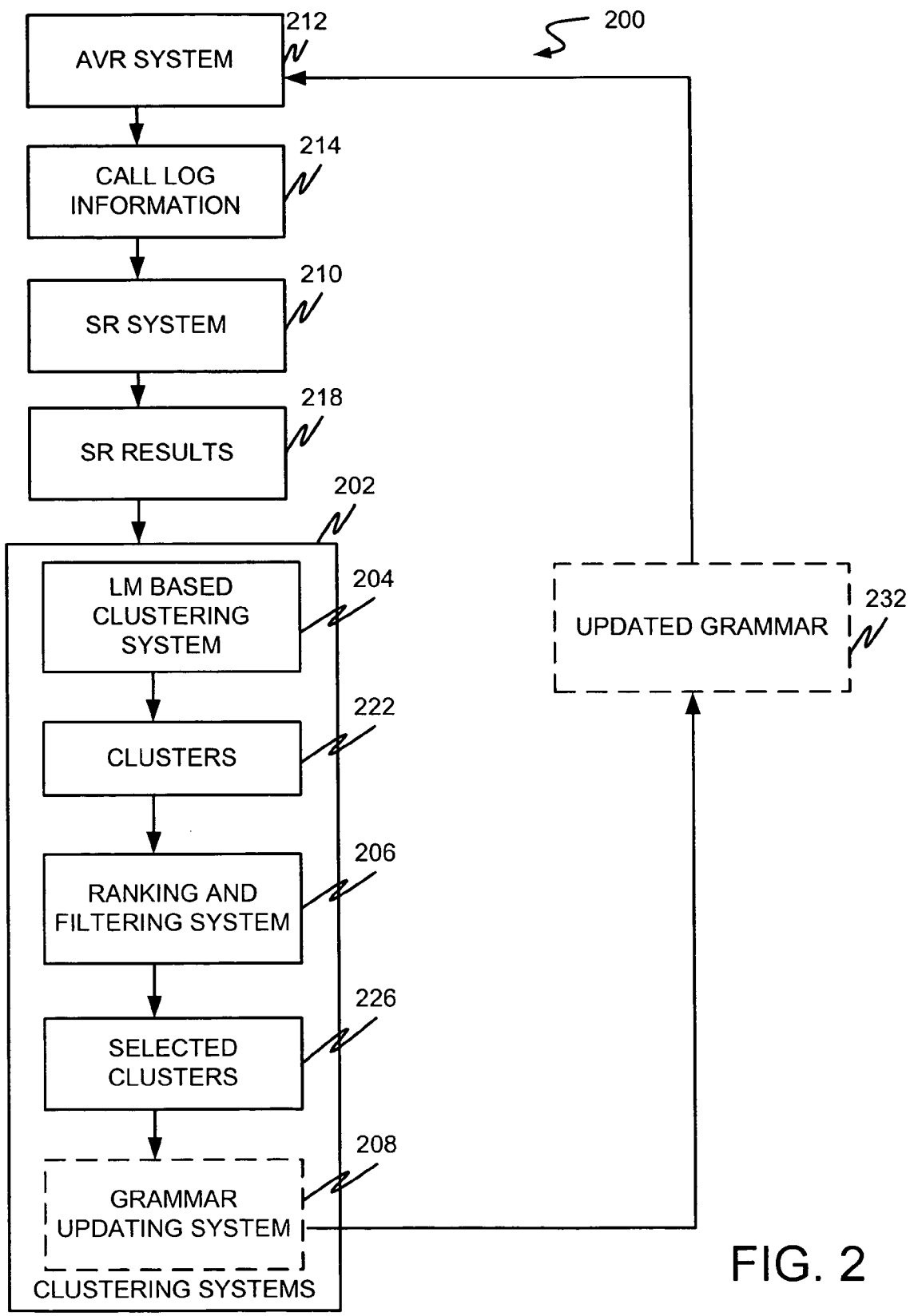
FIG. 2 is a block diagram illustrating processing flow in a clustering system in accordance with one embodiment of the present invention.

FIG. 2 illustrates an acoustic processing system 200 that can be used to cluster acoustics by semantic intent and to optionally suggest updates to a grammar in order to accommodate unanticipated semantic intents. System 200 includes a clustering system 202 which, itself, includes language model based clustering system 204, ranking and filtering system 206, and optional grammar updating system 208. FIG. 2 also shows that clustering system 202 is coupled to speech recognition system 210 and an automatic voice response (AVR) system (or application) 212.

AVR system (or application) 212 is illustratively a human-machine interface that receives voice commands from a human being and attempts to take action based on those commands. In one illustrative embodiment, the voice commands are received by telephone. AVR system also illustratively logs (or stores) the acoustic data representative of the received audio commands. In one specific embodiment, AVR system 212 is an automatic attendant system deployed at a company to receive and direct calls.

Speech recognition system 210 is illustratively a conventional speech recognition system, and illustratively uses acoustic models that are the same as those used in clustering system 202, described below. Speech recognition system 210 illustratively employs a large vocabulary such that it is a large, generalized vocabulary recognizer. Alternatively, speech recognition system 210 can include an in-domain (or context-specific) recognizer in conjunction with a large, generalized vocabulary recognizer.

Clustering system 202 clusters the stored acoustics, based on the speech recognition results. Each cluster is illustratively indicative of a semantic intent expressed by the acoustics in that cluster. System 202 can also, in one embodiment, suggest revisions to the application grammar in AVR system 212.

Figure 3:
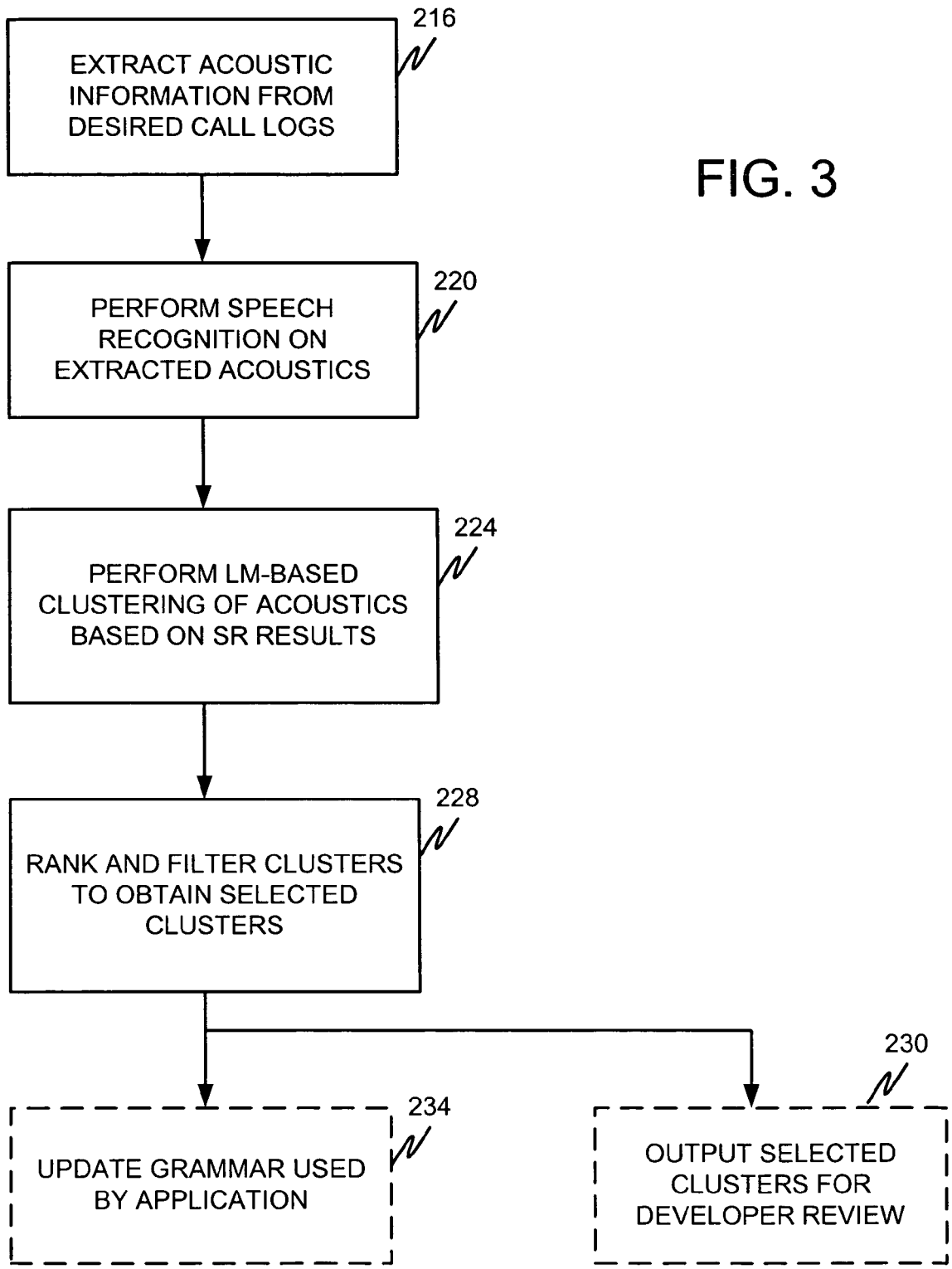
FIG. 3 is a flow diagram illustrating the overall processing steps taken by the system shown in FIG. 2.

FIG. 3 is a flow diagram illustrating the overall operation of system 200 shown in FIG. 2. First, the acoustic information from desired call logs in AVR system 212, is extracted. The call log information is represented by block 214 in FIG. 2 and the extraction step is represented by block 216 in FIG. 3. The desired call log information to be extracted is represented by acoustic waveforms for which semantic intents are to be recovered. These call logs of interest can be identified in a wide variety of ways. For example, the call logs of interest can be the acoustic information corresponding to failed calls in AVR system 212. It can also be a response to a particular prompt from all calls that failed in AVR system 212. By failed, it is generally meant that the caller prematurely hung-up (e.g., hung-up prior to achieving a desired objective or reaching a desired dialog state in AVR system 212 ). For instance, in one specific example, the call log information of interest can be the acoustic waveforms provided in response to a prompt "Good morning, who would you like to contact?" for all calls that ended with the caller hanging up prior to completing a task or speaking with a person. Of course, the call log information of interest 212 can also be all acoustics recorded over a given period of time, or a different subset of those acoustics, as desired.

Once the call log information of interest has been extracted, it is provided to speech recognition system 210 where speech recognition is performed on the extracted acoustics. The speech recognition results are indicated by block 218 in FIG. 2 and the performance of speech recognition on the call log information 214 is indicated by block 220 in FIG. 3.

Speech recognition results 218 can take one of a variety of different forms. For instance, results 218 can be the one-best hypothesis recognized by speech recognition system 210, the n-best hypotheses or a recognition lattice, all of which are known types of outputs from speech recognition systems. It is, of course, important that speech recognition system 210 cover words that are outside the application grammar used by AVR system 212. This is to ensure that most words in the new or unanticipated semantic intents expressed in the extracted call logs are covered and can be recognized by speech recognition system 210. However, it is not necessary that all words be within the grammar coverage of speech recognition system 210, nor is it necessary to have all waveforms correctly recognized. Word level recognition can be used in the present clustering system, even if they are inaccurate recognition results, so long as acoustic waveforms with similar semantics have consistent recognition results. For instance, as long as acoustic waveforms representing the phrase "good morning" are recognized consistently as "get morning" these results can be used by clustering system 202, even though they are incorrect.

Speech recognition results 218 are provided to clustering system 202, and specifically to language model-based clustering system 204. The detailed operation of language model-based clustering system 204 is described later with respect to FIGS. 4 and 5. Suffice it to say, for now, that the acoustic call log information of interest 214 which was extracted from AVR system 212 is clustered based on the semantic intent represented by speech recognition results 218 corresponding to that acoustic information, using a language model clustering approach implemented by system 204. For instance, each acoustic waveform is represented by its recognition results 218. A cluster is modeled by a per-cluster generative language model, which is a generative model of word sequences. The probability of an acoustic waveform, given a cluster, is basically the probability of its recognition results given the cluster language model. This is described in greater detail below with respect to FIGS. 4 and 5.

The semantically based clusters 222 are output by system 204. The performance of language model-based clustering of acoustics based on speech recognition results 218 is indicated by block 224 in FIG. 3.

Clusters 222 are then ranked and filtered by system 206. The clustering performed by clustering system 204 may result in a significant number of clusters. Therefore, it may be important to select certain of those clusters for presentation to an application developer, in order to save time and resources. This involves ranking the clusters in order of importance, filtering out unimportant or "garbage" clusters and representing a cluster in a simple and relatively self-descriptive way.

In accordance with one embodiment of the present invention, clusters 222 are ranked based on their frequency (i.e., based on the number of instances of utterances contained in a cluster). This information indicates how frequently a semantic intent occurs in the dataset.

Once the clusters 222 are ranked based on frequency, they are filtered. A cluster with a high frequency may not necessarily be relevant. For instance, there may be a relatively high number of calls that consist only of silence, noise, or other incoherent speech. These "garbage" utterances tend to be recognized as some certain function words or word sequences such as "a", "oh", "the", for example. They are likely to be clustered together with a high cluster prior count. However, unlike utterances in a cluster with meaningful semantics, these garbage word sequences are seldom consistent with one another.

Therefore, in accordance with one embodiment of the present invention, a "consistency" measure is used to filter out garbage clusters. This metric can also be referred to as "compactness" as it is computed in an attempt to pick out those clusters with a large portion of constant instances, and to identify a "center" instance to represent the generative cluster. In one embodiment, a similarity measure is first defined between two utterances to be the number of word tokens they have in common, normalized by the total number of word tokens in both of their n-best decoding results. The "consistency" is then defined as the normalized, pair-wise similarity of all utterances in a cluster. The clusters with a consistency lower than a threshold value are considered "garbage" and are discarded. The threshold value can be empirically determined.

It will be recognized that there is a trade-off in setting the consistency threshold. If it set relatively high, then this enhances the likelihood that only relevant clusters will meet the consistency threshold, but the system may then discard some important or relevant clusters. If the threshold is set relatively low, then it is unlikely that the system will miss or filter out any relevant clusters, but it is more likely that it will include some garbage clusters.

Once ranking and filtering system 206 has ranked and filtered the clusters, it selects a central utterance to represent each remaining cluster. This utterance can be chosen to have a highest sum of similarities with all other utterances in the same cluster, or it can be chosen in other ways as well. This will likely turn out to be intuitively the most representative utterance in the cluster. The distance measure for "similarity" will illustratively be the same as that used to define consistency when filtering the clusters.

The selected clusters output by system 206 are represented by block 226 in FIG. 2, and the process of ranking and filtering clusters to obtain the selected clusters 208 is indicated by block 228 in FIG. 3.

In one illustrative embodiment, clustering system 202 is finished after this step and simply outputs the selected clusters 226 for developer review. This is indicated by block 230 in FIG. 3. In this embodiment (in which the selected clusters 226 are output), the present invention effectively helps an application developer to reduce the number of clusters which the developer is required to review, but the application developer still needs to decide, by inspecting the representative utterance(s) for each selected cluster 226 (or by listening to the corresponding acoustics if the speech recognition results are erroneous) whether the cluster has an unanticipated semantic intent or whether it has one that already exists in the application grammar used by AVR system 212. Again, in this embodiment, once one of the selected clusters 226 is decided to have a new semantic intent, the application developer illustratively generates any necessary corrections to the word sequences in the cluster (in case the speech recognition results were erroneous as discussed above) and can use the cluster to learn or generate a new grammar rule based on the corrected word sequences. The new grammar rule can be generated automatically or manually. The updated grammar or rule can then be used to update the grammar used by AVR system 212 in order to accommodate the previously unanticipated semantic intent.

However, it will also be appreciated that the present clustering system 202 can include optional grammar updating system 208 which automatically generates a new grammar rule or updates the application grammar based on the selected clusters 226. One suggested update to the application grammar can simply be the language model generated for the cluster. The top rule for the application grammar will then be given a weight which may illustratively be one minus the sum of the weights of all other newly discovered rules representing all other semantic intents. The new rule or grammar will thus be integrated into the existing application grammar and can be used by AVR system 212. The updated application grammar is indicated by block 232 in FIG. 2, and the process of automatically updating the grammar used by the application is indicated by block 234 in FIG. 3.

A number of modifications can also be made to the embodiments described herein in order to assist the developer. For instance, where the selected clusters are output to the developer for review, the developer needs to decide which clusters are already represented by the application grammar and which are new (or were unanticipated). In order to do this, speech recognition system 210 may employ not only the large vocabulary recognizer, but may also employ the application grammar used by AVR system 212. In that embodiment, if the speech recognition results 218 were generated using the large vocabulary grammar (or background grammar), but not the application grammar, they can be tagged as such and therefore easily identified as representing a new semantic intent (one not previously anticipated by the grammar used by AVR system 212). However, if the speech recognition results 218 were generated by speech recognition system 210 using the application grammar used by AVR system 212, then they can be tagged as such and easily identified as representing a semantic intent that is already covered by the application grammar.

If the results are tagged in this way, then the clusters can be identified as representing unanticipated semantic intent or previously covered semantic intent by simply counting the number of utterances in each cluster that have speech recognition results that were generated using the application grammar and those generated using the background grammar. If most of the utterances in a given cluster were generated using the background grammar, the developer may wish to determine that the cluster represents an unanticipated semantic intent. Alternatively, if most utterances corresponding to the cluster were generated using the application grammar, the developer may wish to determine that the semantic intent represented by that cluster is already covered by the application grammar. Of course, different schemes or thresholds can be used, as desired, in order to determine whether the cluster represents a new or existing semantic intent.

For instance, speech recognition results generated from the different grammars are not likely to be clustered together, since they likely do not have many lexicon items in common. Therefore, each cluster will likely have a pronounced majority of recognition results generated from one grammar, but not both. Therefore, the tag of the representative utterance may be sufficient to indicate whether the cluster represents known or unanticipated semantic intent.

Alternatively, instead of only clustering calls that ended in failure, the acoustic information for all calls to AVR system 212 can be used in accordance with the present invention, even if the calls succeeded. The acoustics corresponding to calls that failed can easily be tagged, as can the acoustic scores corresponding to calls that succeeded. The utterances represented by the acoustics tagged as corresponding to calls that succeeded can be assumed to contain semantic intent that is already covered by the application grammar. Those tagged as corresponding to calls that failed can be assumed to contain semantic intent that is not anticipated by the application grammar. It will of course be readily appreciated that this does not require the application grammar to be employed by the speech recognition system 210, but it still allows the grammar updating system 208 to automatically determine whether a cluster represents unanticipated semantic intent or semantic intent that is already know by system 212.

C. Clustering in More Detail

Figure 4:
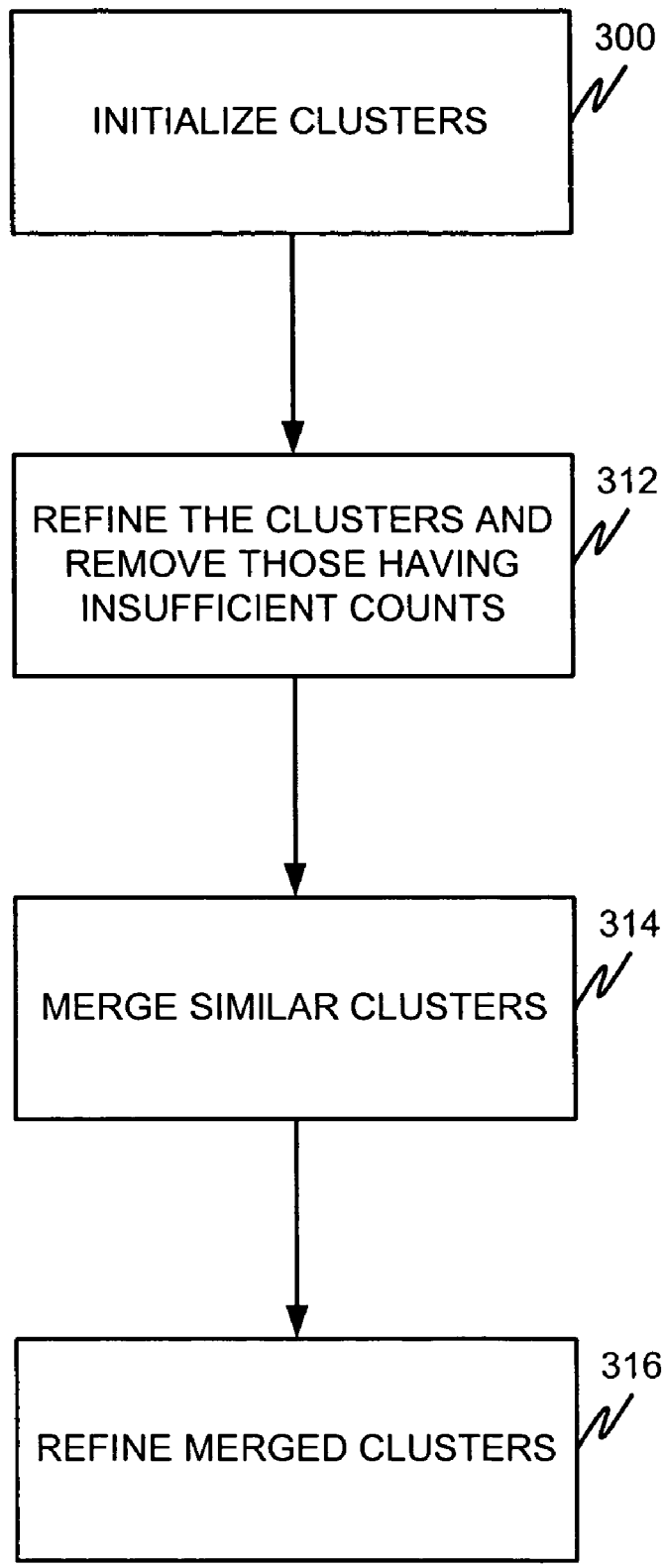
FIG. 4 is a flow diagram illustrating one illustrative method for language model-based clustering in more detail.

FIG. 4 is a flow diagram which illustrates one illustrative embodiment of the particular language model-based clustering approach used by clustering system 204, in greater detail. In one illustrative embodiment, a generative Markov model is used, where the acoustic feature sequence x of an utterance is generated from a word sequence w according to an acoustic model p(x|w), and a word sequence w is generated from a semantic intent (or cluster) c based on a per-cluster n-gram language model p(w|c). The complete likelihood of x,w and c then becomes:

$$p(x,w,c) = p(x|w)p(w|c)p(c), \quad \text{Eq. 1}$$

The present system illustratively trains models corresponding to semantic clusters so as to maximize the likelihood p(x). In one illustrative embodiment, a fixed acoustic model p(x|w) is used in clustering. This model is trained offline on a large set of telephony speech. Per-cluster uni-grams can be used to model p(w|c), where the sentence end probability is set to be equal among all clusters.

As previously mentioned, semantic intents are often expressed by very short utterances in telephony applications. Therefore, uni-grams can be chosen because it is believed that in such applications, a uni-gram language model corresponding to a semantic cluster has a perplexity that is not much higher than a bi-gram (or tri-gram) language model, but has a much lower computational complexity. Therefore, training in accordance with the present invention involves estimating the alphabet of the cluster c, the prior probability for semantic clusters p(c), and the language models p(w|c).

1. Model Initialization

Before discussing estimation of the language models in more detail, it should first be noted that model initialization can be important in unsupervised clustering. Therefore, the first step is to initialize models corresponding to the clusters. This is indicated by block 300 shown in FIG. 4. The process of initializing the clusters is indicated in greater detail by the flow diagram shown in FIG. 5, which will now be discussed, before the discussion proceeds with respect to the remaining blocks in FIG. 4.

In order to initialize the clusters, the language model based clustering system 204 first enumerates all vocabulary items in the speech recognition results 218. This is indicated by block 302 in FIG. 5. For instance, assume that the speech recognition results included the utterances "operator", "ACME operator", and "the operator". A cluster is thus initialized corresponding to each of the words "operator", "ACME", and "the", since these are the lexical items (or words) contained in the speech recognition results 218. Therefore, the number of clusters created is the same as the number of vocabulary items that have a count no less than a floor count (in the present example, the floor count is one) in the speech recognition results 218, each cluster corresponding to one of the vocabulary items (or words) in the results. Creating a cluster for each enumerated vocabulary item is indicated by block 304 in FIG. 5.

The speech recognition results that contain these lexical items are then assigned to each of the clusters. For instance, since the speech recognition result "operator" contains the word "operator", that utterance will be assigned only to the cluster created for the word "operator". The utterance "ACME operator", on the other hand, will be assigned to both the cluster created for the word "operator" and the cluster created for the word "AMCE", since it contains both words. Similarly, the utterance "the operator" will be assigned both to the cluster created for the word "the" and the cluster created for the word "operator".

The prior probability for each cluster p(c) corresponding to a word v is set to the normalized number of utterances containing v in that cluster. This is indicated by block 306 in FIG. 5. The instances of utterances are then assigned to the clusters. This is indicated by block 308 in FIG. 5. An n-gram language model p(w|c) for each cluster is then trained based on the word sequences $w_i^*$ containing the word v (i.e., based on the instances assigned to that cluster). This is indicated by block 310 in FIG. 5.

2. Refining the Clusters

Figure 5:
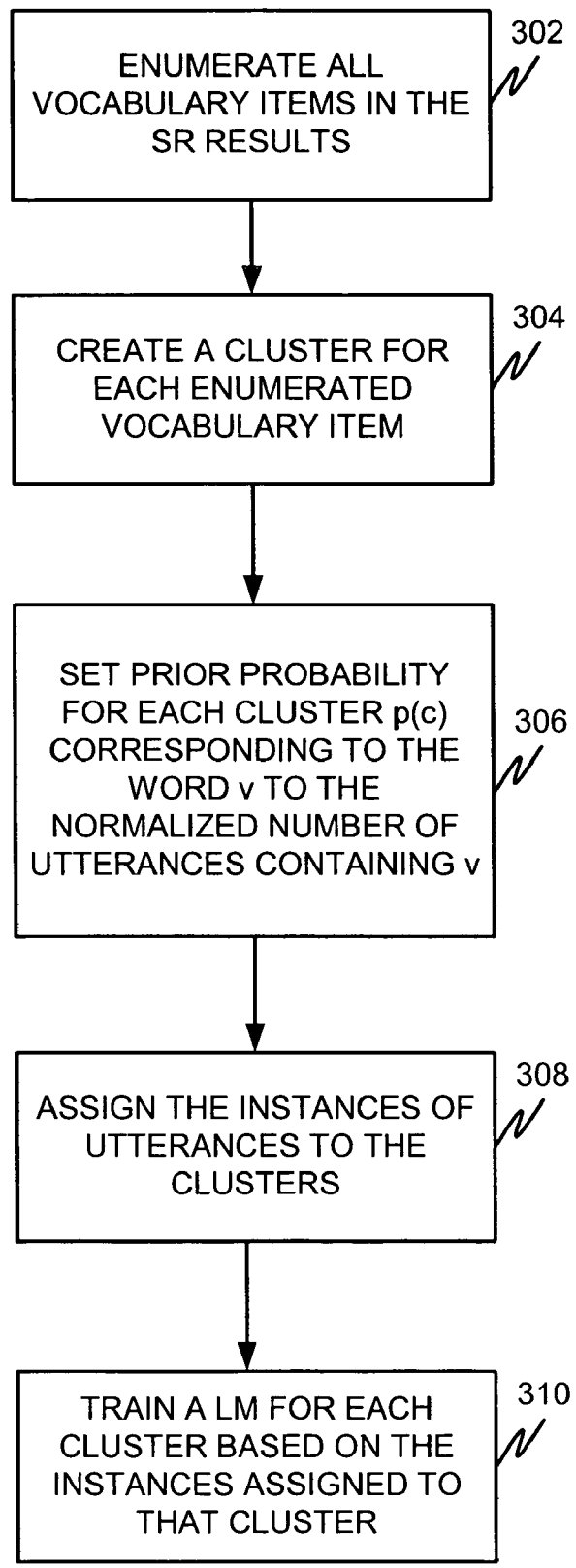
FIG. 5 is a flow diagram illustrating how clusters are initialized in more detail.

Once the clusters and language models are initialized as described with respect to FIG. 5, processing continues in FIG. 4 where the clusters are refined and those having insufficient counts are removed. This is indicated by block 312 in FIG. 4.

Refining the clusters is performed by maximizing the likelihood of an acoustic dataset $\{x_i\}_{i=1}^{M}$ consisting of M waveforms $x_i$. Since w and c are hidden, the EM algorithm can be applied to train the models. This can be done by reassigning each utterance $x_i$ to a cluster by finding the posterior probability:

$$p(c|x_i) = \frac{\sum_w p(c)p(w|c)p(x_i|w)}{\sum_{c'} \sum_w p(c')p(w|c')p(x_i|w)} \quad \text{Eq. 2}$$

where c a is specific cluster and c' is a variable representing cluster i such that the sum over c' means summing over all clusters.

Since the sum over the word sequence w at each iteration is impractical, offline recognition can be employed with a background language model (as opposed to recognition at each iteration using $$\sum_c p(c)p(w|c)). \quad \text{Eq. 3}$$

Then, $$p(c|x_i) = \frac{p(c)p(w_i^*|c)}{\sum_{c'} p(c')p(w_i^*|c')}$$

where $w_i^*$ is the recognition result for $x_i$.

An N-best list or lattice can be used where the N-best list for $x_i$ is $w_{i,1}, \ldots, w_{i,j}, \ldots w_{i,N}$, along with posterior probabilities $p(w_{ij}|x_i)$ where:

$$p(w_{ij}|x_i) = \frac{p(w_{ij})p(x_i|w_{ij})}{\sum_{j'=1}^{N} p(w_{ij'})p(x_i|w_{ij'})} \quad \text{Eq. 4}$$

where $p(w_{ij})$ represents the background language model and $p(x_i|w_{ij})$ represents the acoustic model.

Then, $$p(c|x_i) = \sum_j p(w_{ij}|x_i)p(c|w_{ij}) \quad \text{Eq. 5}$$

$$= \sum_j p(w_{ij}|x_i) \frac{p(c)p(w_{ij}|c)}{\sum_{c'} p(c')p(w_{ij}|c')}$$

For the embodiment in which a lattice is used, the sum over j can be implemented efficiently using a forward/backward algorithm.

We can also find:

$$p(c,w|x_i) = \frac{p(c)p(w|c)p(x_i|w)}{\sum_{c',w'} p(c')p(w'|c')p(x_i|w')} \quad \text{Eq. 6}$$

which can be approximated using recognition as:

$$p(c,w|x_i) = \begin{cases} p(c|xi) & \text{if } w = w_i^* \\ 0 & \text{if } w \neq w_i^* \end{cases} \quad \text{Eq. 7}$$

or using an N-best list or lattices as:

$$p(c,w|x_i) = p(w_{ij}|x_i)p(c|w_{ij}) \quad \text{Eq. 8}$$

$$= p(w_{ij}|x_i) \frac{p(w)p(w_{ij}|c)}{\sum_{c'} p(c')p(w_{ij}|c')}$$

when w is the N-best list, and otherwise:

$$p(c,w|x_i)=0 \quad \text{Eq. 9}$$

We now compute the following counts where $\#_u(w)$ is defined as the number of times that the word token u occurs in the utterance w:

$$\#_c = \Psi_c = \sum_{i=1}^{M} p(c|w_i) \quad \text{Eq. 10}$$

$$\#_{c,u} = \phi_{c,u} = \sum_{i=1}^{M} \sum_w p(c,w|x_i)\#_u(w)$$

$$= \sum_{i=1}^{M} p(c|x_i)\#_u(w_i^*)$$

or $$= \sum_{i=1}^{M} \sum_{j=1}^{N} p(w_{ij}|x_i)p(c|w_{ij})\#_u(w_{ij}) \quad \text{Eq. 11}$$

Computing these expected counts $\psi_c$ and $\phi_{c,u}$ corresponds to the E-step of the EM algorithm which provides sufficient statistics for the likelihood maximization. The M step thus simply includes normalizing $\phi_c$ to give the cluster prior probabilities p(c), and normalizing $\phi_{c,u}$ to give the class-conditional uni-gram probabilities.

In other words, p(c), p(w|c) with p'(c), p'(w|c) as follows:

$$p'(c) = \frac{\psi_c}{\sum_{c'} \psi_{c'}} = \frac{\psi_c}{M} \quad \text{Eq. 12}$$

Since p(w|c) is a uni-gram:

$$p(w|c) = \prod_{k=1}^{l(w)} p_c(w(k)) \quad \text{Eq. 13}$$

where $w(k)$ is the $k^{th}$ word in sentence w, $l(w)$ is the length of sentence w, and $p_c(v)$ is the uni-gram probability of word v in class c. Finally:

$$p'_c(v) = \frac{\psi_{c,v}}{\sum_{v'} \psi_{c,v'}} \qquad \text{Eq. 14}$$

In actual implementation, the language model used in recognition (i.e., $p(w)$ in computing $p(w|x)=p(x|w)p(w)$) is decoupled from the per-cluster uni-gram language models (i.e., $p(w|c)$). In one specific embodiment, a task-independent large vocabulary background language model is used to compute $p(w)$. This has the advantage that with the language model $p(w)$ and the acoustic model $p(x|w)$ fixed, the recognition is performed offline, only once. The obtained word sequence hypotheses and their acoustic scores are used directly in training the clusters.

In addition, in one specific embodiment, for computational efficiency, the word sequence hypothesis is restricted to a lattice, or N-best list, with $p(w|x_i)$ renormalized accordingly. In one aggressive embodiment, wherein an N-best list of length 1 is used, 1-best word sequence is obtained.

3. Model Refining with Viterbi Training

In addition, it should be noted that Viterbi training can be used instead of EM training to optimize cluster parameters. In other words, $p(c|w)$ is renormalized to 0 or 1, depending on whether c is the best hypothesis given w.

More specifically, the following can be used:

$$\tilde{p}(c|x_i) = \begin{cases} 1 & \text{if } c \text{ maximizes } p(c|x_i) \\ 0 & \text{otherwise} \end{cases} \qquad \text{Eq. 15}$$

instead of $p(c|x_i)$ to do "hard" or Viterbi class assignment. This can be more efficient.

For the 1-best case we then have:

$$p(c, w | x_i) = \begin{cases} p & 1 \text{ if } c \text{ is the best class and } w = w^* \\ 0 & \text{otherwise} \end{cases} \qquad \text{Eq. 16}$$

For the embodiment in which an N-best list or lattice is used, there are two options. The first option is to choose one class as an overall choice for all hypotheses. To do this, let $\tilde{p}(c|x_i)$ place a probability of one on maximizer of $p(c|x_i)$ given in Equation 5 above. Then:

$$p(c, w | x_i) = \begin{cases} \tilde{p}(c|x_i) \dfrac{p(w_{ij}|c)}{\sum_{j'=i}^{N} p(w_{ij'}|c)} & \text{if } w = w_{ij} \\ 0 & \text{otherwise} \end{cases} \qquad \text{Eq. 17}$$

The second option is to choose a class per hypothesis. This can be done by letting:

$$p(c, w | x_i) = \qquad \text{Eq. 18}$$
$$\begin{cases} p(w_{ij}|x_i) & \text{if } w = w_{ij} \text{ and } c \text{ maximizes } p(c)p(w_{ij}|c) \\ 0 & \text{otherwise} \end{cases}$$

The second option may be undesirably slow for all but very small N-best lists.

D. Merging of Clusters

At this point, some of the clusters may represent similar semantic intents. Therefore, it may be desirable to merge some of the clusters together based on a distance measure between two clusters (or between the representative language models of the two clusters), and to refine the merged clusters. This is indicated by blocks 314 and 316 in FIG. 4.

Techniques for merging and splitting clustered items have been studied in the field of text clustering. Many of these techniques are based on certain distance measures between two clusters. In one embodiment, the present invention uses a relatively low complexity distance measure based on the K-L divergence between the uni-gram distributions corresponding to two clusters. K-L divergence is explained in greater detail in T. M. Cover and J. A. Thomas, *Elements of Information Theory*, Wiley, (1991).

Assuming $\gamma_{c,u}$ is the uni-gram probability of vocabulary item u in cluster c ($\gamma_{c,u}$ is proportional to $\Phi_{c,u}$) the distance is defined as an average of the asymmetrical K-L divergences, $$D(c_1, c_2) \stackrel{\Delta}{=} \sum_u \left( \gamma_{c1,u} \log \frac{\gamma_{c2,u}}{\gamma_{c1,u}} + \gamma_{c2,u} \log \frac{\gamma_{c1,u}}{\gamma_{c2,u}} \right), \qquad \text{Eq. 19}$$

where u is summed over all vocabulary items appearing in clusters $c_1$ and $c_2$, and any zero probabilities $\gamma_{c1,u}$ or $\gamma_{c2,u}$ are smoothed by a floor value. Two clusters $c_1$ and $c_2$ are merged if their $D(c_1, c_2)$ is smaller than a threshold. Upon merging, $p(w, c_{1,2}|x) = p(w, c_1|x) + p(w, c_2|x)$ and the new model is re-estimated using these new posterior probabilities. A desired number of EM or Viterbi estimations are applied after all such pairs are merged.

In another embodiment, re-estimation can be applied after each pair is merged (the pair with the smallest divergence is to be merged first). But this can greatly increase computation and may thus be undesirable.

As an alternative to K-L divergence, the distance measure between two clusters and hence the measure to determine whether merging of two clusters should take place can be based on the EM auxiliary function. Specifically, the loss in the EM auxiliary function due to merging two clusters can be used as the distance measure between those clusters.

The EM auxiliary function is:

$$\sum_i \sum_{c,w} p(c, w | x_i) \log p'(c) p'(w|c) = \sum_{i=1}^{M} \sum_{c,w} p(c, w | x_i) \qquad \text{Eq. 20}$$
$$[\log p'(c) + \log p'(w|c)]$$
$$= \sum_{i=1}^{M} \sum_{c,w} p(c, w | x_i)$$
$$[\log p'(c) +$$
$$\sum_v \#_v(w) \log p'_c(v)]$$

Using count definitions from the E-step in the above-described EM algorithm:

$$= \sum_c \psi_c \log p'(c) + \sum_{c,v} \psi_{cv} \log p'_c(v) \qquad \text{Eq. 21}$$

using p'(c) and p'$_c$(v) from the M-step described above:

$$= \sum_c \psi_c \log \frac{\psi_c}{M} + \sum_{c,v} \psi_{cv} \log \frac{\psi_{cv}}{\sum_{v'} \psi_{cv'}} \qquad \text{Eq. 22}$$

If we're considering clusters $c_1$ and $c_2$, then the unmerged auxiliary function is computed as:

$$Aux_{unmerged} = \text{(the value independent of } c_1, c_2) + \psi_{c_1} \log \frac{\psi_{c_1}}{M} + \qquad \text{Eq. 23}$$

$$\sum_v \psi_{c,v} \log \frac{\psi_{c,v}}{\sum_{v'} \psi_{c,v'}} + \psi_{c_2} \log \frac{\psi_{c_2}}{M} + \sum_v \psi_{c_1 v} \log \frac{\psi_{c_2 v}}{\sum_{v'} \psi_{c_2 v}}$$

If $c_1$ and $c_2$ are merged, the merged auxiliary function is computed as follows:

$$Aux_{merged} = \qquad \text{Eq. 24}$$

$$\text{(the value independent of } c_1, c_2) + (\psi_{c_1} + \psi_{c_2}) \log \frac{\psi_{c_1} + \psi_{c_2}}{M} +$$

$$\sum_v (\psi_{c_1 v} + \psi_{c_2 v}) \log \frac{\psi_{c_1 v} + \psi_{c_2 v}}{\sum_{v'} (\psi_{c_1 v'} + \psi_{c_2 v'})}$$

The distance between $c_1$ and $c_2$ can be defined as the difference:

$$D(c_1, c_2) = Aux_{unmerged} - AUX_{merger} = \qquad \text{Eq. 25}$$

$$\psi_{c_1} \log \frac{\psi_{c_1}}{\psi_{c_1} + \psi_{c_2}} + \psi_{c_2} \log \frac{\psi_{c_2}}{\psi_{c_1} + \psi_{c_2}} +$$

$$\sum_v \psi_{c_1 v} \frac{\log \psi_{c_1 v}}{\psi_{c_1 v} + \psi_{c_2 v}} + \sum_v \psi_{c_2 v} \log \frac{\psi_{c_2 v}}{\psi_{c_1 v} + \psi_{c_2 v}} -$$

$$\left(\sum_v \psi_{c_1 v}\right) \log \frac{\sum_v \psi_{c_1 v}}{\sum_v \psi_{c_1 v} + \psi_{c_2 v}} - \frac{\left(\sum_v \psi_{c_1 v}\right) \log \left(\sum_v \psi_{c_2 v}\right)}{\left(\sum_v \psi_{c_1 v} + \psi_{c_2 v}\right)}$$

The loss of perplexity can also be used in determining the distance between two clusters. Perplexity is described in greater detail in the following papers: Young, Odell and Woodland, *Tree-Based State Tying for High Accuracy Acoustic Modeling*, ARPA, pages 307-312(March 1994); and Hwang and Huang, *Shared-Distribution Hidden Markov Models for Speech Recognition*, IEEE TSAP, volume 1, number 4, pages 414-420(1993).

In another embodiment, the clusters are merged until the auxiliary function changes by some predetermined amount rather than merging all clusters with a distance less than a threshold. The amount of change in the auxiliary function used to determine whether clusters are merged can be a predetermined percentage or other value empirically determined.

Further, the merging process can be repeated a plurality of times, interspersed with re-estimation. This is referred to as iterative merging.

Recall that once the similar clusters are merged, a representative utterance or label for each cluster is chosen. In one embodiment, this is based on the likelihood p(w|c) calculated for each utterance in each cluster. It should be noted that when the auxiliary function is used for merging and this likelihood is used for choosing a cluster representative, then merging, re-estimation and representative selection are all consistent (performed using the same criteria) and the implementation may thus be simpler.

It can thus be seen that the present invention provides significant advantages over prior systems. For instance, the present invention automatically clusters acoustics based on semantic intent. The present invention can also identify a representative acoustic record (or speech recognition record) representative of each cluster. Therefore, a developer need not listen to a large amount of data to identify unanticipated semantic intents in order to adapt application grammars to accommodate those semantic intents.

The present invention can also be used to suggest grammar rules or models to modify the application grammars either manually or automatically. The present invention also provides significant advantages in how it extracts data, clusters that data based on speech recognition results corresponding to that data, and trains representative models, representative of each cluster.

Although the present invention has been described with reference to particular embodiments, workers skilled in the art will recognize that changes may be made in form and detail without departing from the spirit and scope of the invention.

What is claimed is:

1. A computer implemented method of processing acoustic information, comprising:
   extracting data representing a plurality of sets of acoustic information of interest from a data store;
   performing speech recognition using a computer with an application grammar and a second grammar on the data to obtain speech recognition results;
   identifying whether the speech recognition results are generated with the application grammar or the second grammar;
   performing a semantic analysis of the second data;
   clustering the sets of acoustic information into clusters based on the semantic analysis of the speech recognition results;
   ranking the clusters based on a number of instances of utterances contained in each cluster;
   removing clusters based on a consistency threshold calculation of each cluster that indicates when a cluster has a number of unlike utterances that have meaningful semantics;
   identifying, for each cluster, and storing an indicator of a set of acoustic information as being representative of a corresponding cluster, wherein the identified set of acoustic information is selected from the sets of acoustic information in each corresponding cluster;
   identifying the representative set of acoustic information for a given cluster as representing either a semantic intent covered by the application or as an unrepresented semantic intent based on the speech recognition results assigned to the given cluster were generated using the application grammar or the second grammar; and generating a revision to the application grammar to accommodate for the unrepresented semantic intent.

2. The method of claim 1 wherein clustering comprises:
clustering the sets of acoustic information together if the corresponding speech recognition results have a similar semantic analysis.

3. The method of claim 2 wherein the semantic analysis is indicative of semantic intent expressed by the speech recognition results and wherein clustering comprises:
clustering sets of acoustic information that have corresponding speech recognition results with similar semantic intent.

4. The method of claim 3 wherein clustering comprises:
initializing clusters based on lexical items in the speech recognition results;
assigning the speech recognition results to the initialized clusters;
merging similar clusters; and
re-assigning the speech recognition results to the clusters.

5. The method of claim 4 wherein initializing clusters comprises:
generating a cluster corresponding to each lexical item in the speech recognition results; and
computing a prior probability for each cluster based on a number of speech recognition results that include the lexical item corresponding to that cluster.

6. The method of claim 4 wherein assigning includes:
generating a language model corresponding to each cluster based on the speech recognition results assigned to that cluster.

7. The method of claim 6 wherein assigning comprises:
refining the assignment of speech recognition results to the clusters based on a probability that the language models corresponding to the clusters will produce the speech recognition results; and
re-generating the language models corresponding to the clusters.

8. The method of claim 4 wherein merging comprises:
computing a distance between a pair of clusters; and
merging the pair of clusters into one cluster if the computed distance meets a threshold distance; and
performing the steps of computing and merging for a plurality of pairs of clusters to obtain a refined set of clusters.

9. The method of claim 8 wherein re-assigning comprises:
re-assigning the speech recognition results to the refined set of clusters to obtain a set of refined clusters.

10. The method of claim 9 wherein clustering further comprises:
filtering the set of refined clusters based on a similarity of the speech recognition results to one another in each of the refined clusters, to obtain filtered clusters.

11. The method of claim 10 wherein filtering comprises:
removing clusters that have a compactness value that is lower than a threshold compactness value, wherein the compactness value is determined from a normalized, pair-wise similarity of multiple utterances in a cluster, and wherein removing the clusters includes removing the cluster and the speech recognition results assigned to the removed cluster from being used in a generated language model.

12. The method of claim 10 and further comprising:
ranking the filtered clusters based on the speech recognition results assigned to the filtered clusters.

13. The method of claim 12 wherein identifying a set of acoustic information as being representative, comprises:
computing a distance in similarity between each speech recognition result assigned to a given cluster and other speech recognition results assigned to the given cluster; and
identifying a speech recognition result having a smallest distance in similarity to the other speech recognition results in the given cluster; and
identifying, as the representative set of acoustic information for the given cluster, the set of acoustic information corresponding to the identified speech recognition result.

14. The method of claim 4 wherein merging comprises:
merging clusters until a defined auxiliary function changes by a predetermined amount.

15. The method of claim 4 wherein merging comprises:
iteratively merging clusters and re-assigning speech recognition results to clusters.

16. The method of claim 4 wherein extracting sets of acoustic information of interest comprises:
identifying acoustic information of interest stored by a human-machine interface application configured to process input speech indicative of semantic intent covered by the application.

17. The method of claim 16 wherein the application comprises an automatic voice response application and wherein extracting comprises:
extracting stored call log information received by the application.

18. The method of claim 17 wherein the stored call log information indicates whether the call log information was generated from a failed call in which a caller prematurely hung up.

19. The method of claim 18 further comprising identifying the representative set of acoustic information for each given cluster as representing either a semantic intent covered by the application or as an unrepresented semantic intent, based on whether the speech recognition results assigned to the given cluster correspond to acoustic information from failed calls.

20. The method of claim 18 wherein extracting comprises:
extracting only acoustic information generated from failed calls.

21. The method of claim 1 wherein identifying acoustic information as being representative, comprises:
identifying the acoustic information based on a likelihood that speech represented by the acoustic information will be generated, given the corresponding cluster.

22. The method of claim 1 wherein generating a revision comprises:
generating a language model for each cluster; and
outputting, as the revision, the language model corresponding to clusters for which the representative set of acoustic information corresponds to an unrepresented semantic intent.

23. A system for processing acoustic information, comprising:
a computer memory including instructions to execute a clustering component configured to:
cluster sets of acoustic information, from an application, into clusters based on a semantic analysis of speech recognition results of speech recognition performed on the sets of acoustic information;
rank the clusters based on a number of instances of utterances contained in each cluster;

remove clusters based on a consistency threshold calculation of each cluster that indicates when a cluster has a number of unlike utterances that have meaningful semantics;

identify, for each cluster, a set of acoustic information as being representative of a corresponding cluster, wherein the identified set of acoustic information is selected from the sets of acoustic information in each corresponding cluster;

identify the representative set of acoustic information for a given cluster as representing either a semantic intent covered by the application or as an unrepresented semantic intent based on the speech recognition results assigned to the given cluster were generated using an application grammar or a second grammar; and generate a revision to the application grammar to accommodate for the unrepresented semantic intent.

24. The system of claim 23 wherein the semantic analysis is indicative of semantic intent expressed by the speech recognition results and wherein the clustering component is configured to cluster those sets of acoustic information that have corresponding speech recognition results with similar semantic intent.

25. The system of claim 24 wherein the clustering component comprises:

a language model-based clustering component configured to initialize clusters based on lexical items in the speech recognition results, assign the speech recognition results to the initialized clusters, generate a language model for each cluster based on the speech recognition results assigned to each cluster, and refine assignment of the speech recognition results to the clusters based on probabilities generated by the language models.

26. The system of claim 25 wherein the clustering component is configured to merge similar clusters with one another to obtain merged clusters, and to re-assigning the speech recognition results to the merged clusters.

27. The system of claim 25 wherein the clustering component is configured to initialize the clusters by generating a cluster corresponding to each lexical item in the speech recognition results, and computing a prior probability for each cluster based on a number of speech recognition results that include the lexical item corresponding to that cluster.

28. The system of claim 25 wherein the clustering component is configured to merge similar clusters by computing a distance between a pair of clusters, merging the pair of clusters into one cluster if the computed distance meets a threshold distance, and performing the steps of computing and merging for a plurality of pairs of clusters to obtain a refined set of clusters.

29. The system of claim 28 wherein the clustering component is configured to re-assign the speech recognition results to the refined set of clusters to obtain a set of refined clusters.

30. The system of claim 28 wherein the clustering component is configured to identify a set of acoustic information as being representative by computing a distance in similarity between each speech recognition result assigned to a given cluster and other speech recognition results assigned to the given cluster, identify a speech recognition result having a smallest distance in similarity to the other speech recognition results in the given cluster, and identify, as the representative set of acoustic information for the given cluster, the set of acoustic information corresponding to the identified speech recognition result.

31. A computer storage medium storing instructions which, when executed by a computer, cause the computer to process acoustic information by performing steps of:

extracting a plurality of sets of acoustic information of interest from a data store;

performing speech recognition on the acoustic information to obtain speech recognition results;

identifying whether the speech recognition results are generated with the application grammar or the second grammar;

clustering the sets of acoustic information into clusters based on a semantic analysis of the speech recognition results;

ranking the clusters based on a number of instances of utterances contained in each cluster;

removing clusters based on a consistency threshold calculation of each cluster that indicates when a cluster has a number of unlike utterances that have meaningful semantics;

identifying, for each cluster, and storing an indicator of a set of acoustic information as being representative of a corresponding cluster, wherein the identified set of acoustic information is selected from the sets of acoustic information in each corresponding cluster;

selecting, for each cluster, a set of acoustic information from the sets of acoustic information in a particular cluster as being representative of the particular cluster;

identifying the representative set of acoustic information for a given cluster as representing either a semantic intent covered by the application or as an unrepresented semantic intent based on the speech recognition results assigned to the given cluster were generated using the application grammar or the second grammar; and generating a revision to the application grammar to accommodate for the unrepresented semantic intent.

32. The computer storage medium of claim 31 wherein clustering comprises:

clustering the sets of acoustic information together if the corresponding speech recognition results have a similar semantic analysis.

33. The computer storage medium of claim 32 wherein the semantic analysis is indicative of semantic intent expressed by the speech recognition results and wherein clustering comprises:

clustering sets of acoustic information that have corresponding speech recognition results with similar semantic intent.

* * * * *